US012595753B2

(12) United States Patent

McCarthy, Jr. et al.

(10) Patent No.: US 12,595,753 B2

(45) Date of Patent: *Apr. 7, 2026

---

(54) ROCKER ARM ASSEMBLY

(71) Applicant: Eaton Intelligent Power Limited, Dublin (IE)

(72) Inventors: James E. McCarthy, Jr., Kalamazoo, MI (US); Douglas J. Nielsen, Marshall, MI (US); Kshamta Bishno, Pune (IN); Nicola Andrisani, Cumiana (IT)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/960,494

(22) Filed: Nov. 26, 2024

(65) Prior Publication Data

US 2025/0129729 A1     Apr. 24, 2025

Related U.S. Application Data

(63) Continuation of application No. 18/103,051, filed on Jan. 30, 2023, now Pat. No. 12,163,447, which is a continuation-in-part of application No. 16/831,965, filed on Mar. 27, 2020, now Pat. No. 11,578,625, which is a continuation of application No.
(Continued)

(30) Foreign Application Priority Data

| Mar. 16, 2016 | (IN) | ............................. | 201611009132 |
| Apr. 28, 2016 | (IN) | ............................. | 201611014772 |

(51) Int. Cl.
| *F01L 1/18* | (2006.01) |
| *F01L 1/053* | (2006.01) |
| *F01L 1/24* | (2006.01) |
| *F01L 1/26* | (2006.01) |
| *F01L 13/06* | (2006.01) |
(Continued)

(52) U.S. Cl.
CPC ................. *F01L 1/181* (2013.01); *F01L 1/24* (2013.01); *F01L 1/2416* (2013.01); *F01L 1/267* (2013.01); *F01L 13/06* (2013.01); *F01L 13/065* (2013.01); *F16K 15/044* (2013.01); *F16K 15/1823* (2021.08); *F01L 2001/0535* (2013.01); *F01L 1/2405* (2013.01); *F01L 1/2411* (2013.01); *F01L 2305/00* (2020.05)

(58) Field of Classification Search
CPC .... F16K 15/044; F16K 15/1823; F01L 1/181; F01L 1/2416; F01L 1/267; F01L 13/06; F01L 13/065
See application file for complete search history.

(56) References Cited

U.S. PATENT DOCUMENTS

| 12,163,447 B2 * | 12/2024 | McCarthy, Jr. | ......... F01L 1/185 |
| 2015/0144096 A1 * | 5/2015 | Meneely | ................. F01L 1/181 |
| | | | 123/321 |

* cited by examiner

*Primary Examiner* — Kevin A Lathers
(74) *Attorney, Agent, or Firm* — Baker Botts L.L.P.

(57)     ABSTRACT

A rocker arm configured to perform a first event and a second event against a valve bridge assembly operably associated with first and second engine valves includes a rocker arm body configured to rotate about a rocker shaft. The rocker arm body includes a first event rocker arm assembly comprising a hydraulic capsule in a bore, and a second event rocker arm assembly. The first event rocker arm assembly is configured to selectively engage the valve bridge assembly to open the first and second engine valves.

20 Claims, 10 Drawing Sheets

Related U.S. Application Data

16/130,496, filed on Sep. 13, 2018, now Pat. No. 10,626,758, which is a continuation of application No. PCT/US2016/069452, filed on Dec. 30, 2016.

(60) Provisional application No. 63/267,801, filed on Feb. 10, 2022.

(51) Int. Cl.
    *F16K 15/04*        (2006.01)
    *F16K 15/18*        (2006.01)

Valve
bridge

ROCKER ARM ASSEMBLY

PRIORITY

This application is a continuation under 35 U.S.C. § 120 of U.S. patent application Ser. No. 18/103,051, filed 30 Jan. 2023, which claims the benefit under 35 U.S.C. § 119(e) of U.S. Provisional Patent Application No. 63/267,801, filed 10 Feb. 2022, and is a continuation-in-part under 35 U.S.C. § 120 of U.S. patent application Ser. No. 16/831,965, filed 27 Mar. 2020, now issued as U.S. Pat. No. 11,578,625 on 14 Feb. 2023, which is a continuation under 35 U.S.C. § 120 of U.S. patent application Ser. No. 16/130,496, filed 13 Sep. 2018, now issued as U.S. Pat. No. 10,626,758 on 21 Apr. 2020, which claims the benefit under 35 U.S.C. § 365(c) of International Patent Application No. PCT/US2016/069452, filed 30 Dec. 2016, which claims the benefit of Indian Patent Application No. 201611014772, filed 28 Apr. 2016, and Indian Patent Application No. 201611009132, filed 16 Mar. 2016, each of which is incorporated herein by reference.

TECHNICAL FIELD

The present disclosure relates generally to a rocker arm assembly for use in a valve train assembly and, more particularly, to a rocker arm assembly having an engine braking bridge.

BACKGROUND

Compression engine brakes can be used as auxiliary brakes in addition to wheel brakes, for example, on relatively large vehicles powered by heavy or medium duty diesel engines. A compression engine braking system is arranged, when activated, to provide an additional opening of an engine cylinder's exhaust valve when the piston in that cylinder is near a top-dead-center position of its compression stroke so that compressed air can be released through the exhaust valve. This causes the engine to function as a power consuming air compressor which slows the vehicle.

In a typical valve train assembly used with a compression engine brake, the exhaust valve is actuated by a rocker arm which engages the exhaust valve by means of a valve bridge. The rocker arm rocks in response to a cam on a rotating cam shaft and presses down on the valve bridge which itself presses down on the exhaust valve to open it. A hydraulic lash adjuster may also be provided in the valve train assembly to remove any lash or gap that develops between the components in the valve train assembly.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF PARTICULAR EMBODIMENTS

In one aspect of the present disclosure, a rocker arm configured to perform a first event and a second event against a valve bridge assembly operably associated with first and second engine valves is provided. The rocker arm includes a rocker arm body configured to rotate about a rocker shaft. The rocker arm body includes a first event rocker arm assembly comprising a hydraulic capsule in a bore, and a second event rocker arm assembly. The first event rocker arm assembly is configured to selectively engage the valve bridge assembly to open the first and second engine valves.

In addition to the foregoing, the rocker arm may include one or more of the following features: wherein the first event rocker arm assembly further includes a lost motion mechanism disposed in the bore; wherein the lost motion mechanism includes a lost motion plunger body and a lost motion biasing mechanism configured to selectively absorb motion of the rocker arm; wherein the first event rocker arm assembly further includes a travel limit configured to limit travel of the lost motion plunger body within the bore; wherein the lost motion biasing mechanism is configured to bias the lost motion plunger body toward the travel limit; and wherein the lost motion plunger body includes a groove configured to selectively fluidly connect to a hydraulic fluid port extending between the second event rocker arm assembly and the first event rocker arm assembly.

In addition to the foregoing, the rocker arm may include one or more of the following features: wherein the hydraulic capsule is a hydraulic lash adjuster (HLA) assembly configured to take up any lash between the hydraulic capsule and the valve bridge assembly; wherein the hydraulic capsule includes a check ball assembly positioned between an outer plunger body and an inner plunger body; wherein the second event rocker arm assembly includes a second bore configured to at least partially receive a plunger assembly; wherein the plunger assembly is configured to selectively operate in a collapse mode and a rigid mode; wherein the second event rocker arm assembly further includes an actuator assembly operably associated with the plunger assembly; wherein the second event rocker arm assembly is disposed between the first event rocker arm assembly and the rocker shaft in an axial direction of the rocker arm body; and wherein the first event rocker arm assembly is disposed between the second event rocker arm assembly and the rocker shaft in an axial direction of the rocker arm body.

In another aspect of the present disclosure, a rocker arm configured to perform a first event and a second event against a valve bridge assembly operably associated with first and second engine valves is provided. The rocker am includes a rocker arm body, a first event rocker arm assembly formed in the rocker arm body and having a hydraulic lash adjuster (HLA) assembly integrated with a lost motion mechanism, and a second event rocker arm assembly formed in the rocker arm body. The first event rocker arm assembly is configured to selectively engage a valve bridge assembly to open the first and second exhaust valves. The second event rocker arm assembly is configured to selectively engage the valve bridge to open only the second exhaust valve.

In addition to the foregoing, the rocker arm may include one or more of the following features: wherein the HLA assembly is configured to take up lash between the HLA assembly and the valve bridge assembly, and wherein the lost motion mechanism is configured to absorb motion of the rocker arm assembly during the second event; wherein the second event rocker arm includes a plunger assembly configured to selectively operate in a collapse mode and a rigid mode; and wherein the plunger assembly includes a check ball assembly positioned between an outer plunger body and an inner plunger body.

In another aspect of the present disclosure, a method of manufacturing a rocker arm configured to perform a first event and a second event against a valve bridge assembly operably associated with first and second engine valves is provided. The method includes providing a rocker arm body configured to rotate about a rocker shaft, the rocker arm body including a first event rocker arm assembly and a second event rocker arm assembly, and providing a hydraulic capsule in a bore formed in the first event rocker arm assembly. The first event rocker arm assembly is configured to selectively engage the valve bridge assembly to open the first and second engine valves.

In addition to the foregoing, the method may include one or more of the following features: providing the hydraulic capsule as a hydraulic lash adjuster (HLA), and providing a lost motion mechanism in the bore formed in the first event rocker arm assembly; and providing a plunger assembly in a second bore formed in the second event rocker arm, the plunger assembly configured to selectively operate in a collapse mode that does not impart movement to the second engine valve, and a rigid mode configured to selectively engage the valve bridge assembly to open only the second exhaust valve.

BRIEF DESCRIPTION OF THE DRAWINGS

The present disclosure will become more fully understood from the detailed description and the accompanying drawings, wherein.

DESCRIPTION OF EXAMPLE EMBODIMENTS

Figure 1:
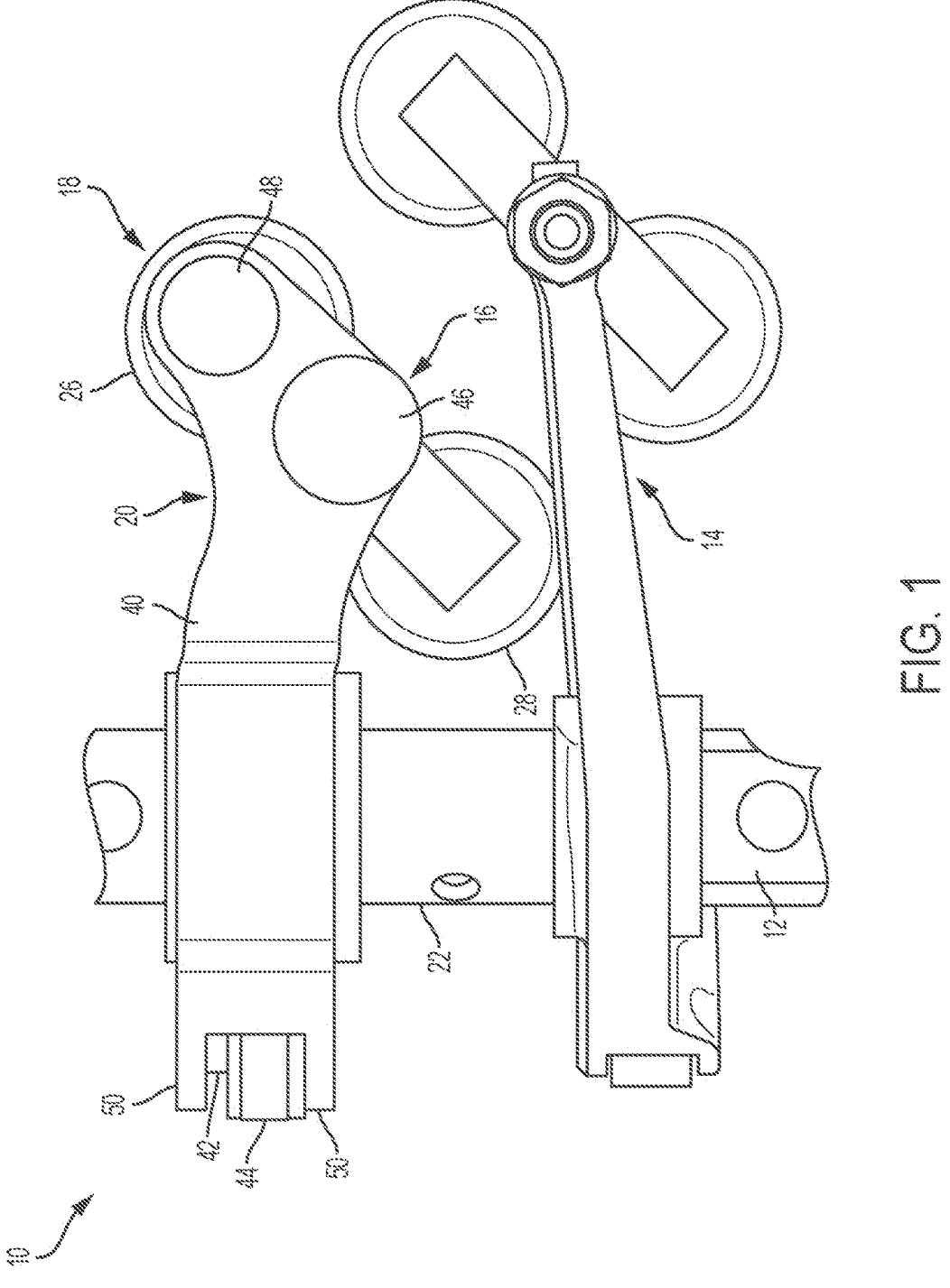
FIG. 1 is a plan view of a valve train assembly incorporating a rocker arm assembly that includes an intake rocker arm assembly and a combined exhaust rocker arm assembly and engine brake rocker arm assembly, constructed in accordance to one example of the present disclosure.
Figure 2:
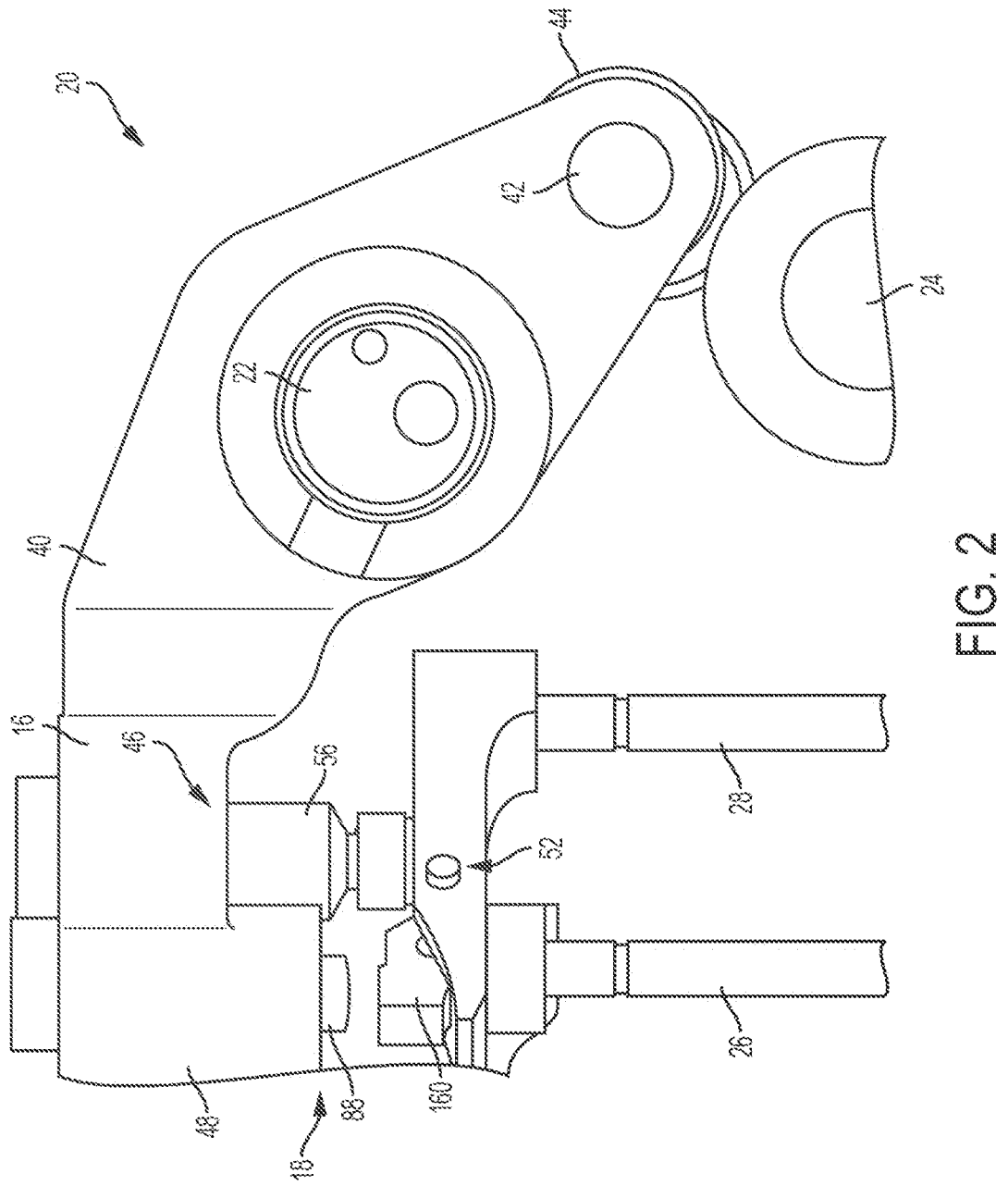
FIG. 2 is a perspective view of the combined rocker arm assembly shown in FIG. 1, including an exhaust capsule and an engine brake capsule constructed in accordance to one example of the present disclosure.

With initial reference to FIGS. 1 and 2, a partial valve train assembly constructed in accordance to one example of the present disclosure is shown and generally identified at reference 10. The partial valve train assembly 10 utilizes engine braking and is shown configured for use in a three-cylinder bank portion of a six-cylinder engine. It will be appreciated however that the present teachings are not so limited. In this regard, the present disclosure may be used in any valve train assembly that utilizes engine braking. The partial valve train assembly 10 is supported in a valve train carrier 12 and can include two rocker arms per cylinder.

Specifically, each cylinder includes an intake valve rocker arm assembly 14, an exhaust rocker arm assembly 16, and an engine brake rocker arm assembly 18. However, as illustrated, the exhaust valve rocker arm assembly 16 and the engine brake rocker arm assembly 18 are combined into a single rocker arm and are collectively referred to as a combined exhaust and engine brake rocker arm assembly 20, which cooperates to control opening of the exhaust valves. The intake valve rocker arm assembly 14 is configured to control motion of the intake valves, the exhaust valve rocker arm assembly 16 is configured to control exhaust valve motion in a drive mode, and the engine brake rocker arm assembly 18 is configured to act on one of the two exhaust valves in an engine brake mode, as will be described herein.

A rocker shaft 22 is received by the valve train carrier 12 and supports rotation of the combined exhaust and engine brake rocker arm assembly 20. As described herein in more detail, the rocker shaft 22 can communicate oil to the assemblies 16, 18 during operation. A cam shaft 24 (FIG. 2) includes lift profiles or cam lobes configured to rotate assemblies 16, 18 to activate first and second exhaust valves 26 and 28, as is described herein in more detail. For example, FIG. 3 illustrates cam shaft 24 with an exhaust event lift profile or lobe 30 and a brake event lift profile or lobe 32, which respectively cause combined rocker arm assembly 20 to operate in an exhaust event mode and a brake event mode.

Figure 3:
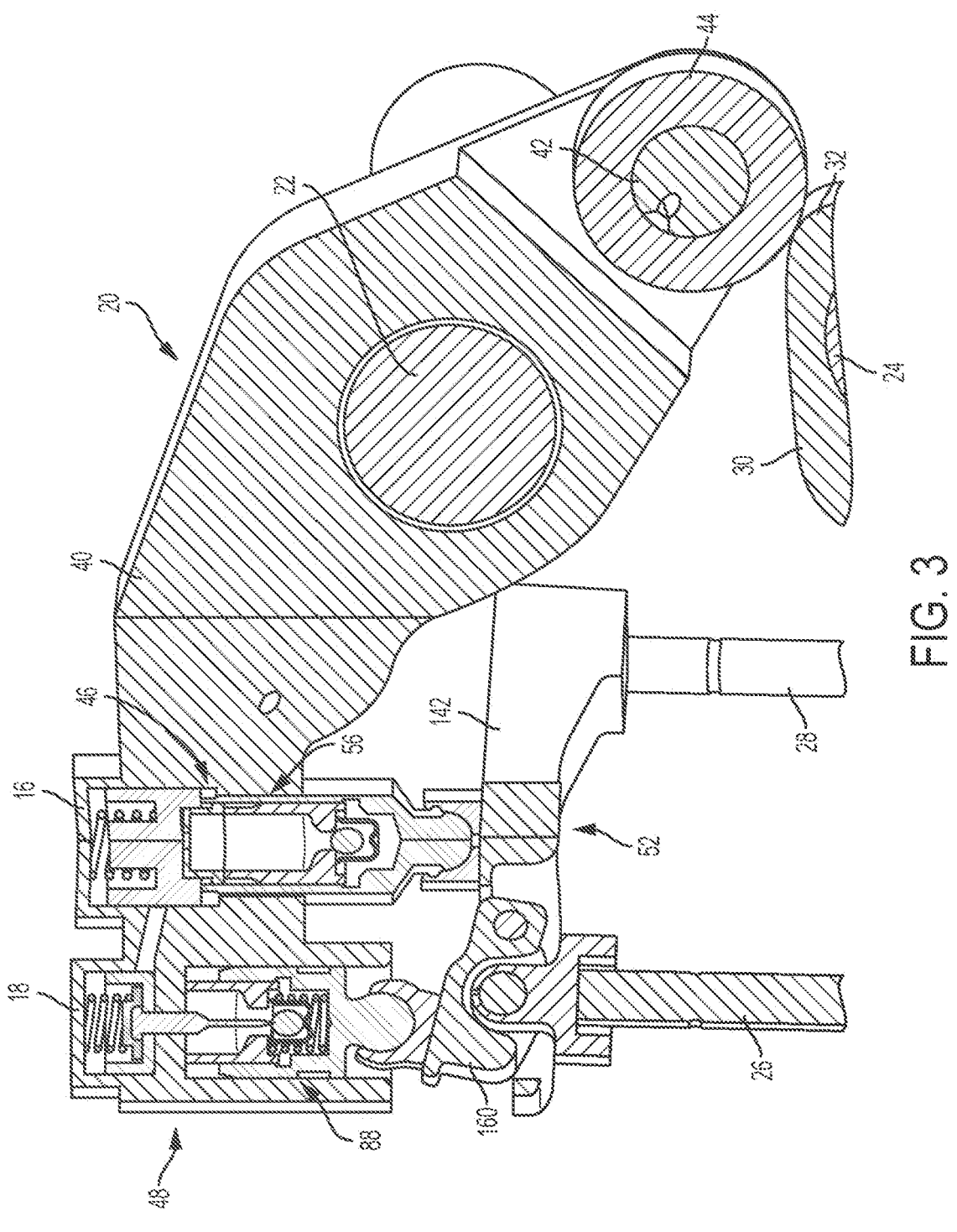
FIG. 3 is a cutaway view of the combined exhaust and brake rocker arm assembly shown in FIG. 2 in a first mode.

With further reference now to FIGS. 1-3, the combined exhaust and engine brake rocker arm assembly 20 will now be further described. The combined rocker arm assembly 20 can generally include a rocker arm body 40, an axle 42, and a roller 44. The rocker arm body 40 includes an exhaust rocker arm portion 46, and an engine brake rocker arm portion 48. Rocker arm body 40 can receive the rocker shaft 22 and defines a pair of flanges 50 to receive the axle 42 such that roller 44 is positioned at least partially therebetween. As such, the axle 42 can be coupled to the rocker arm body 40 and can receive the roller 44, which is configured to be engaged by the exhaust lift lobe 30 or engine brake lobe 32 of the cam shaft 24. This engagement of the roller causes combined rocker arm assembly 20 to engage a valve bridge assembly 52, as described herein in more detail.

The exhaust valve rocker arm assembly 16 can include exhaust rocker arm portion 46, which defines a bore 54 configured to at least partially receive a hydraulic lash adjuster (HLA) assembly or exhaust capsule assembly 56 integrated with a lost motion mechanism 58. As such, the exhaust rocker arm portion 46 provides both an automatic hydraulic lash adjustment feature and a lost motion feature. When roller 44 is engaged by the exhaust lift profile 30, the exhaust rocker arm portion 46 and exhaust capsule assembly 56 can be rotated downward, causing downward movement of the valve bridge assembly 52, which engages the first and second exhaust valve 26 and 28 (FIG. 2) associated with a cylinder of an engine (not shown).

The exhaust capsule assembly 56 is configured to take up any lash between the exhaust capsule assembly 56 and the valve bridge assembly 52. With additional reference to FIGS. 6A-6C, in one exemplary implementation, the exhaust capsule assembly 56 can comprise a plunger assembly 60 including an outer plunger or first plunger body 62 and an inner or second plunger body 64 operably associated with a stopper 6. The plunger assembly 60 is received by bore 54 defined in exhaust rocker arm portion 46, and can have a first closed end defining a spigot 68, which is received in a socket 70 that acts against the valve bridge assembly 52. The second plunger body 64 has an opening that defines a valve seat 72, and a check ball assembly 74 can be positioned between the first and second plunger bodies 62, 64.

Figures 6A, 6B, 6C:
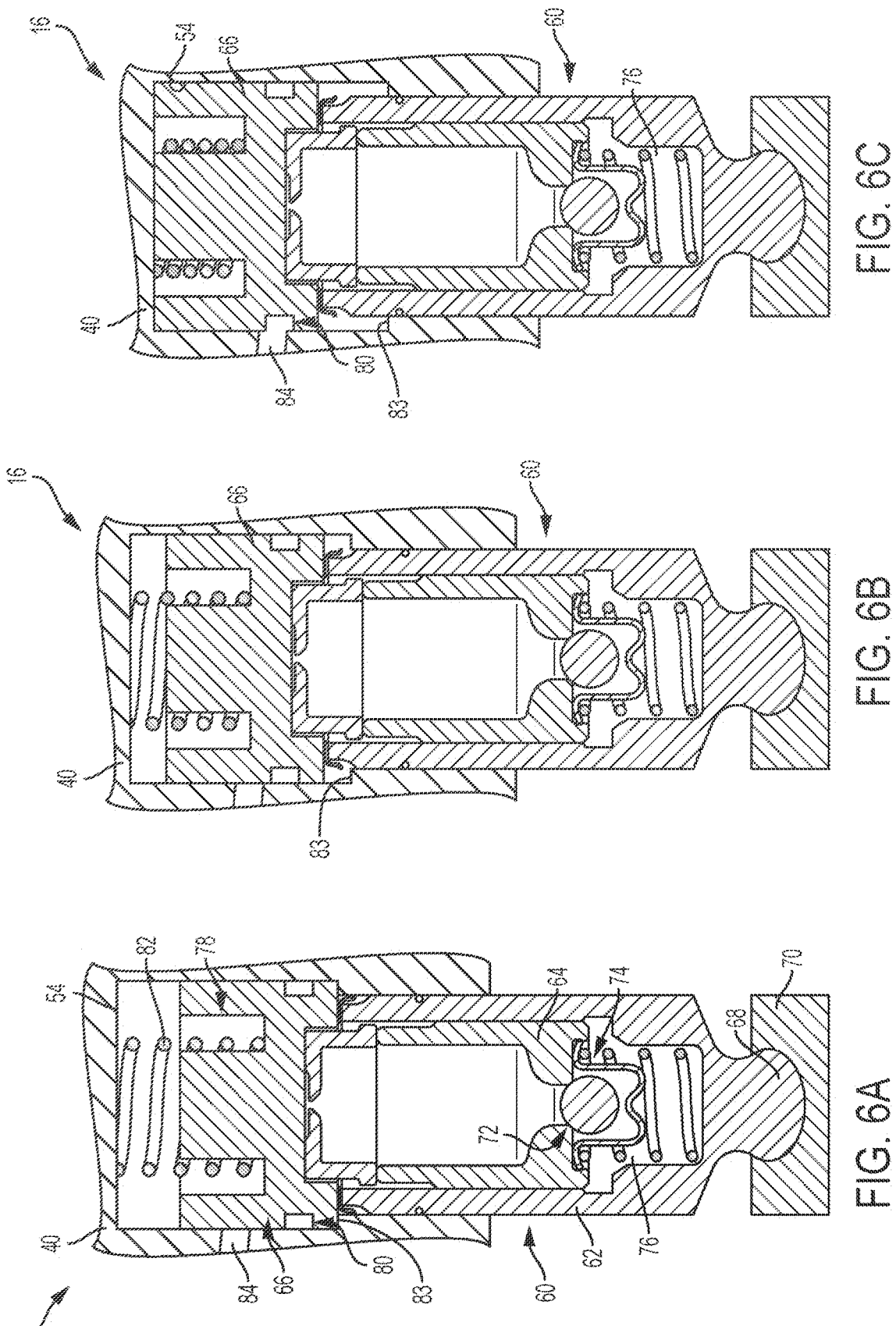
FIG. 6A is a cross-sectional view of the exhaust capsule shown in FIGS. 2-5 in a first position.
FIG. 6B is a cross-sectional view of the exhaust capsule shown in FIG. 6A in a second position.
FIG. 6C is a cross-sectional view of the exhaust capsule shown in FIG. 6A in a third position.

The check ball assembly 74 can be configured to hold oil within a chamber 76 between the first and second plunger bodies 62, 64. A biasing mechanism 77 (e.g., a spring) biases second plunger body 64 upward (as shown in FIGS. 6A-6C) to expand the first plunger body 62 to take up any lash. As second plunger body 64 is biased upward, oil is drawn through check ball assembly 74 and into the chamber 76 between plunger bodies 62, 64. Accordingly, oil can be supplied from rocker shaft 22 through a channel (not shown) to the chamber within second plunger 64, and downward pressure can cause downward movement of the first plunger body 62 due to the oil in the chamber 76. However, exhaust capsule assembly 56 may have any other suitable configuration that enables exhaust capsule assembly 56 to take up lash between the capsule assembly and the valve bridge assembly 52.

The lost motion mechanism 58 includes the stopper 6, also called a lost motion plunger body, and a lost motion biasing mechanism 82. The stopper 6 is disposed within bore 54 above the first and second plunger bodies 62, 64 and generally includes an annular or generally annular bore 78 and an annular or generally annular groove 80. The annular bore 78 is configured to receive and seat at least a portion of the lost motion biasing mechanism 82 (e.g., a spring) such that the biasing mechanism 82 is disposed between the rocker arm body 40 and the lost motion plunger body 66. Biasing mechanism 82 can be configured to bias lost motion plunger body 66 downward toward a travel limiting stop or shoulder 83 (as shown in FIG. 6A) and to selectively absorb motion of the rocker arm assembly 20 (shown in FIG. 5), as described herein in more detail. Annular groove 80 is formed in an outer wall of stopper 6 and is configured to selectively receive a hydraulic fluid from a fluid port 84 that is formed in rocker arm body 40 when annular groove 80 and fluid port 84 are aligned, as shown in FIG. 6C and described herein in more detail.

With continued reference now to FIGS. 1-3, engine brake rocker arm assembly 18 will be further described. The engine brake rocker arm assembly 18 can generally include engine brake rocker arm portion 48, which defines a bore 86 configured to at least partially receive an HLA assembly or brake capsule assembly 88. When roller 44 is engaged by the engine brake lift profile 32, the engine brake rocker arm portion 48 and brake capsule assembly 88 can be rotated downward, causing downward movement of the valve bridge assembly 52, which engages only the first exhaust valve 26 (i.e., not valve 28), as described herein in more detail.

The brake capsule assembly 88 is configured to selectively move from a collapsing mode (FIG. 7A) to a rigid mode (FIG. 7B) to selectively transfer cam motion to the valve 26 during an engine braking event. With additional reference to FIGS. 7A and 7B, in one example implementation, the brake capsule assembly 88 can generally include a brake plunger assembly 90 and an actuator assembly 92.

In the example implementation, the brake plunger assembly 90 can comprise a leak down plunger or first plunger body 94 and a ball plunger or second plunger body 96. The plunger assembly 90 is received by bore 86 defined in engine brake rocker arm portion 48, and can have a first closed end defining a spigot 98, which is received in a socket 100 that acts against the valve bridge assembly 52. The second plunger body 96 has an opening that defines a valve seat 102, and a check ball assembly 104 can be positioned between the first and second plunger bodies 94, 96.

Figure 7B:
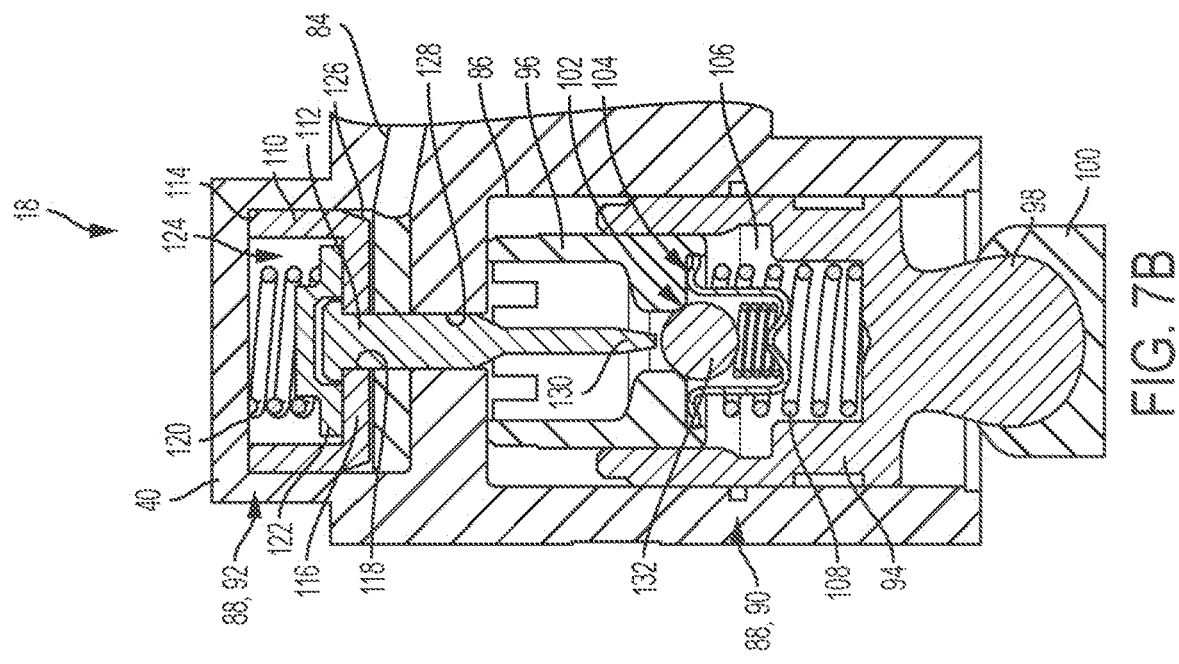
FIG. 7B is a cross-sectional view of the engine brake capsule shown in FIG. 7A in a second position.
Figure 7A:
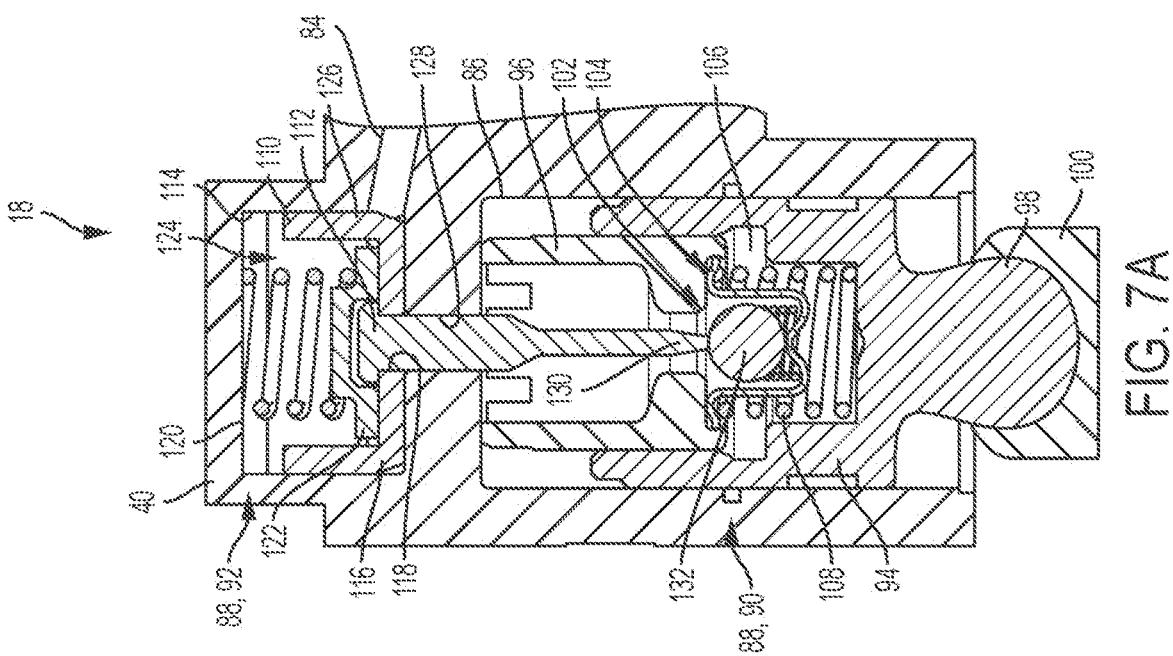
FIG. 7A is a cross-sectional view of the engine brake capsule shown in FIGS. 2-5 in a first position.

The check ball assembly 104 can be configured to hold oil within a chamber 106 between the first and second plunger bodies 94, 96. A biasing mechanism 108 (e.g., a spring) biases second plunger body 96 upward (as shown in FIGS. 7A and 7B) to expand the first plunger body 94 and move to the rigid mode. As second plunger body 96 is biased upward, oil is drawn through check ball assembly 104 and into the chamber 106 between plunger bodies 94, 96. Accordingly, oil can be supplied from rocker shaft 22 through a channel (not shown) to the chamber within second plunger 96, and downward pressure can cause downward movement of the first plunger body 94 due to the oil in the chamber 106. However, plunger assembly 90 may have any other suitable configuration that enables brake capsule assembly 88 to function as described herein.

The actuator assembly 92 generally includes a retainer 110 and a pin 112. In the example implementation, actuator assembly 92 is received in a secondary bore 114 defined in engine brake rocker arm portion 48 and fluidly coupled to hydraulic fluid port 84. The retainer 110 includes a closed end 116 having an aperture 118 formed therein configured to receive pin 112. A biasing mechanism 120 (e.g., a spring) and a biasing mechanism seat 122 are disposed within a chamber 124 formed within retainer 110 such that biasing mechanism 120 is configured to bias the retainer 110 downward toward the brake plunger assembly 90. Retainer 110 includes a chamfered edge 126 such that hydraulic fluid supplied through port 84 provides an upward force against retainer 110.

The pin 112 extends through retainer 110 and an aperture 128 formed between bores 86 and 114 such that a distal end 130 of pin 112 is disposed proximate a ball 132 of the check ball assembly 104. By supplying high pressure fluid to secondary bore 114 via fluid port 84, actuator assembly 92 can be lifted from a lowered position (FIG. 7A) to a raised position (FIG. 7B). In particular, the supplied fluid acts against chamfered edge 126 and the bottom surface of retainer 110 to force the actuator assembly 92 to the raised position.

In the lowered position, pin 112 pushes the ball 132 downward and away from valve seat 102 such that low pressure oil is not trapped in chamber 106, thereby enabling plunger assembly 90 to operate in the collapse mode where the first plunger body 94 can slide upwardly around second plunger body 96.

When high pressure oil is supplied to port 84, actuator assembly 92 moves upwardly to the raised position such that pin 112 is raised and the ball 132 is biased against the valve seat 102. As such, oil is trapped in chamber 106 and becomes pressurized when loaded during brake events, thereby enabling plunger assembly 90 to operate in the rigid mode and transmit motion from cam 24 to the brake valve 26 to enable the braking event.

Many known engines with hydraulic valve lash adjustment have a single rocker arm that actuates two valves through a valve bridge across those valves. The engine brake bypasses the bridge and pushes on one of the valves, which cocks or angles the valve bridge, to open a single valve and blow down the cylinder. However, due to the cocked valve bridge, the HLA can react by extending to take up the lash created. This may be undesirable because, after the brake event, the extended HLA assembly can then hold the exhaust valves open with certain loss of compression and possibly piston-to-valve contact.

To overcome this potentially undesirable event, assembly 10 includes valve bridge assembly 52 having a movable lever assembly 140 integrated therein. The lever assembly 140 can pass some of the valve actuation force back to the exhaust capsule assembly 56 (via bridge 52), thereby preventing unintended extension of the exhaust capsule assembly during the braking event. Thus, lever assembly 140 allows the valve 26 to open during the engine braking operation without allowing downward motion of the valve bridge assembly 52. Moreover, lever assembly 140 significantly reduces the actuation force required for the braking event compared to known systems.

Figure 8:
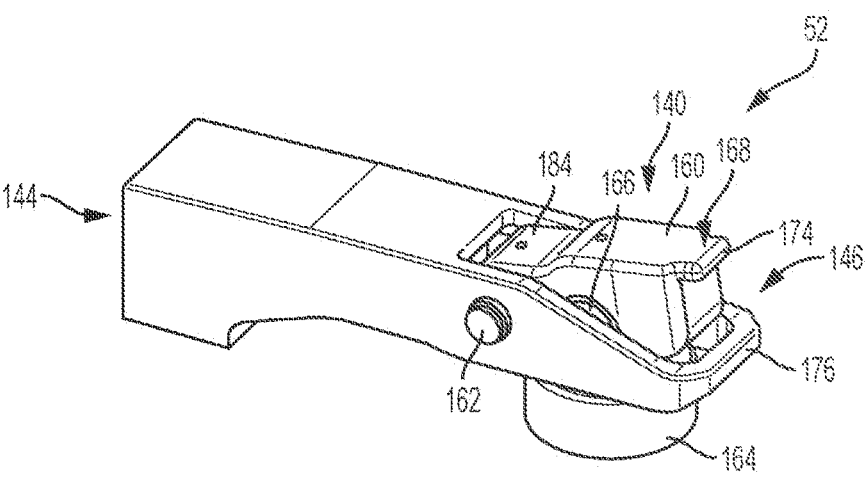
FIG. 8 is a perspective view of a valve bridge assembly of the rocker arm assembly shown in FIG. 1, constructed in accordance to one example of the present disclosure.
Figure 9:
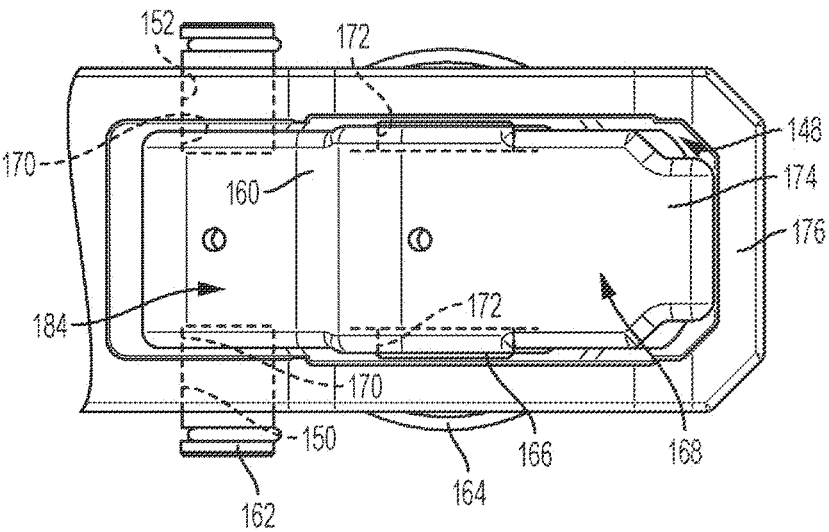
FIG. 9 is a plan view of a portion of the valve bridge assembly shown in FIG. 8.

With additional reference to FIGS. 8 and 9, in one exemplary implementation, the valve bridge assembly 52 comprises the lever assembly 140 disposed within a main bridge main body 142. The bridge main body 142 includes a first end 144 and a second end 146. The first end 144 can be configured to engage valve 28, and the second end 146 can include a first aperture 148, a second aperture 150, and a third aperture 152.

As shown in FIG. 8, the lever assembly 140 can generally include a lever 160, a bridge pin 162, a valve shoe 164, and a valve shoe pin 166. The lever 160 can be disposed within the first aperture 148 and is rotatably coupled to the bridge main body 142 by the bridge pin 162, which extends through the second and third apertures 140, 142 of the bridge main body 142.

The lever 160 includes an engagement surface 168, first opposed openings 170, second opposed openings 172, and a stop flange 174. The engagement surface 168 is configured to be selectively engaged by socket 100 of brake plunger assembly 90. In one example, socket 100 is coupled to lever 160 to maintain constant contact for dynamic stability. First opposed openings 170 can receive the bridge pin 162, and the second opposed openings 172 can receive the valve shoe pin 166. The stop flange 174 can be configured to engage a bar 176 (FIGS. 8 and 9) of the bridge main body 142 to limit downward movement of the lever 160 (as shown in FIG. 8).

The valve shoe 164 includes a main body portion 178 and a connecting portion 180 having an aperture 182 formed therein. The main body portion 178 is configured to receive a portion of the valve 26, and the connecting portion 180 is at least partially disposed within lever 160 such that the connecting portion aperture 182 receives the valve shoe pin 166 to rotatably couple the valve shoe 164 to the lever 160.

Accordingly, lever 160 can be selectively engaged at the engagement surface 168, which can cause rotation about pin 166 and upward movement of an opposed side 174 of the lever that is opposite surface 168. This upward movement of lever end 174 causes upward movement of bridge main body 142 toward exhaust capsule assembly 56 to prevent extension thereof.

As such, during operation of rocker arm assembly 20, the exhaust rocker arm assembly 16 can selectively engage the valve bridge main body 142 to actuate valves 26, 28 and perform a normal exhaust event (combustion mode); whereas, the engine brake rocker arm assembly 18 can selectively engage the lever assembly 140 to only actuate valve 26 and perform a brake event actuation (engine braking mode).

With reference now to FIGS. 3-7, an exemplary operating sequence of the combined exhaust and engine brake rocker arm assembly 20 will be described. In particular, rocker arm assembly 20 can operate in the following four modes: (1) a braking event with deactivated braking, (2) a braking event with activated braking, (3) an exhaust event with deactivated braking, and (4) an exhaust event with activated braking.

FIGS. 3, 6A, 6B, and 7A illustrate rocker arm assembly 20 operating in (1) the braking event with deactivated braking mode. As shown in FIG. 3, rocker arm assembly 20 is engaged by the brake lift cam profile 32 of cam shaft 24. In particular, as cam shaft 24 rotates, cam profile 32 engages roller 44, which causes the rocker arm 40 and thus rocker arm assemblies 16, 18 to rotate about the rocker shaft 22. However, high pressure fluid is not supplied through fluid port 84, which causes brake plunger assembly 90 to operate in the collapse mode (FIG. 7A) where the first plunger body 94 can slide upwardly around second plunger body 96. Accordingly, as engine brake rocker arm assembly 18 is rotated downward and socket 100 contacts the engagement surface 168 of lever 160, brake plunger assembly 90 collapses such that engine brake rocker arm assembly 18 does not transfer the cam motion to the valve 26. At the same time, exhaust rocker arm assembly 16 is rotated downward and socket 70 contacts bridge main body 132. This forces plunger assembly 60 upward, which causes upward movement of stopper 6. Lost motion biasing mechanism 82 absorbs the brake lift such that exhaust rocker arm assembly 16 does not transfer the cam motion to valves 26, 28 (FIGS. 6A and 6B).

Figure 4:
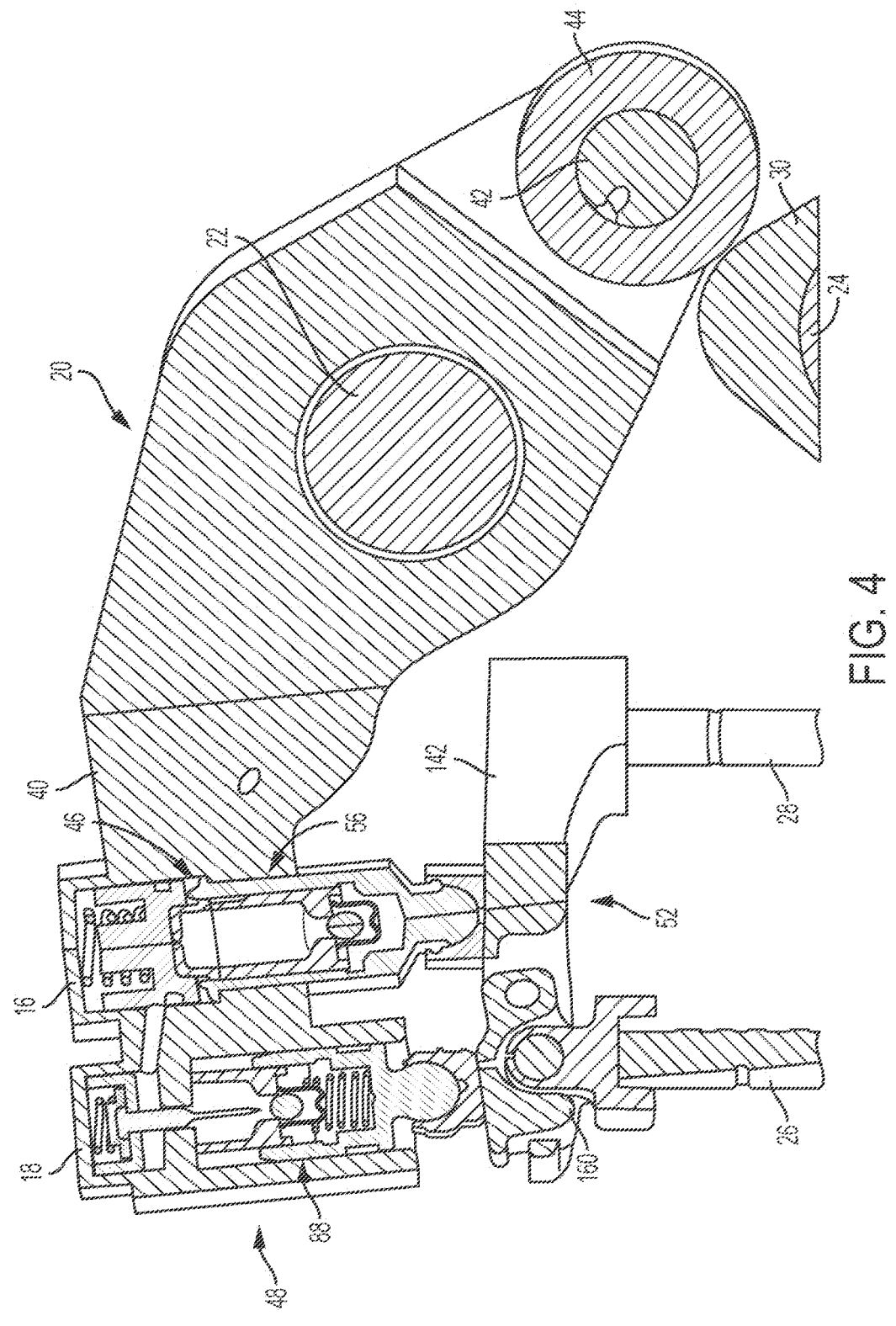
FIG. 4 is a cutaway view of the combined exhaust and engine brake rocker arm assembly shown in FIG. 2 in a second mode.

FIGS. 4, 6A, 6B, and 7B illustrate rocker arm assembly 20 operating in (2) the braking event with activated braking mode. As shown in FIG. 4, rocker arm assembly 20 is engaged by the brake lift cam profile 32 of cam shaft 24. In particular, as cam shaft 24 rotates, cam profile 32 engages roller 44, which causes the rocker arm 40 and thus rocker arm assemblies 16, 18 to rotate about the rocker shaft 22. In this mode, high pressure fluid is supplied through fluid port 84, which raises actuator assembly 92 such that brake plunger assembly 90 operates in the rigid mode (FIG. 7B) where first plunger body 94 does not move relative to second plunger body 96. Accordingly, as engine brake rocker arm assembly 18 is rotated downward and socket 100 contacts the engagement surface 168 of lever 160, the rigid brake plunger assembly 90 transfers the cam motion and opens valve 26 via lever 160. At the same time, exhaust rocker arm assembly 16 is rotated downward and socket 70 contacts bridge main body 132. This forces plunger assembly 60 upward, which causes upward movement of stopper 6. Lost motion biasing mechanism 82 absorbs the brake lift such that exhaust rocker arm assembly 16 does not transfer the cam motion to valves 26, 28.

Figure 5:
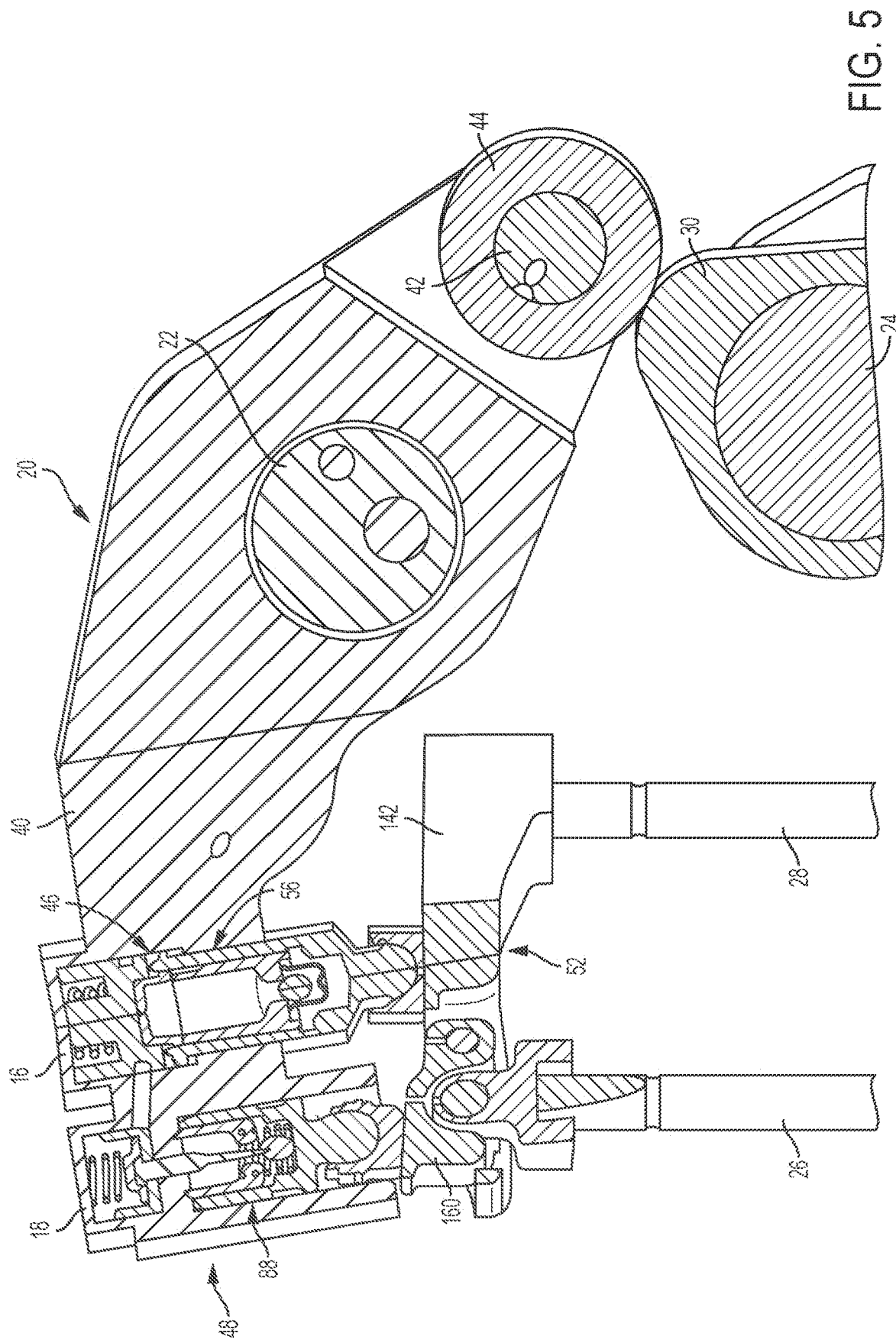
FIG. 5 is a cutaway view of the combined exhaust and engine brake rocker arm assembly shown in FIG. 2 in a third mode.

FIGS. 5, 6A, 6C, and 7A illustrate rocker arm assembly 20 operating in (3) the exhaust event with deactivated braking mode. As shown in FIG. 5, rocker arm assembly 20 is engaged by the exhaust lift cam profile 30 of cam shaft 24. In particular, as cam shaft 24 rotates, cam profile 32 engages roller 44, which causes the rocker arm 40 and thus rocker arm assemblies 16, 18 to rotate about the rocker shaft 22. However, high pressure fluid is not supplied through fluid port 84, which causes brake plunger assembly 90 to operate in the collapse mode (FIG. 7A) where the first plunger body 94 can slide upwardly around second plunger body 96. Accordingly, as engine brake rocker arm assembly 18 is rotated downward and socket 100 contacts the engagement surface 168 of lever 160, brake plunger assembly 90 collapses such that engine brake rocker arm assembly 18 does not transfer the cam motion to the valve 26. At the same time, exhaust rocker arm assembly 16 is rotated downward and socket 70 contacts bridge main body 132. This forces plunger assembly 60 upward, which causes upward movement of stopper 6. Lost motion biasing mechanism 82 absorbs the exhaust lift until stopper 6 contacts the upper wall of bore 54 (FIG. 6C). At this point, because exhaust lift cam profile 32 is larger than brake lift cam profile 30, exhaust rocker arm assembly 16 is rotated further downward than during the brake lift event. Because stopper 6 is in contact with the upper wall of bore 54, the cam motion is transferred through exhaust capsule assembly 56 and moves the bridge main body 142 downward to open the first and second exhaust valves 26, 28.

FIGS. 5, 6A, 6C, 7A, and 7B illustrate rocker arm assembly 20 operating in (4) the exhaust event with activated braking mode. However, it may be undesirable to perform a braking event during an exhaust event. Accordingly, rocker arm assembly 20 is configured to reset the brake capsule assembly 88 to the collapse mode if braking mode is activated during an exhaust event.

In this configuration, rocker arm assembly 20 will look similar to that shown in FIG. 5 except brake capsule assembly 88 is in the activated mode (FIG. 7A) and supplied with high pressure fluid from port 84. To prevent the rigid brake plunger assembly 90 from transferring the cam motion and opening valve 26 (via lever 160), exhaust capsule assembly 56 is configured to vent the fluid that is lifting actuator assembly 92.

More specifically, in the example embodiment, when exhaust rocker arm assembly 16 is rotated downward, socket 70 contacts bridge main body 132. This forces plunger assembly 60 upward, which causes upward movement of stopper 6. Lost motion biasing mechanism 82 absorbs the exhaust lift until stopper 6 contacts the upper wall of bore 54 (FIG. 6C). At this point, annular groove 80 aligns with fluid port 84, which vents the high pressure fluid that is lifting actuator assembly 92 and causes brake plunger assembly 90 to return to the collapse mode. As such, engine brake rocker arm assembly 18 does not transfer the cam motion to the valve 26. However, because stopper 6 is in contact with the upper wall of bore 54, the cam motion is transferred through exhaust capsule assembly 56 and moves the bridge main body 142 downward to open the first and second exhaust valves 26, 28.

Figure 10:
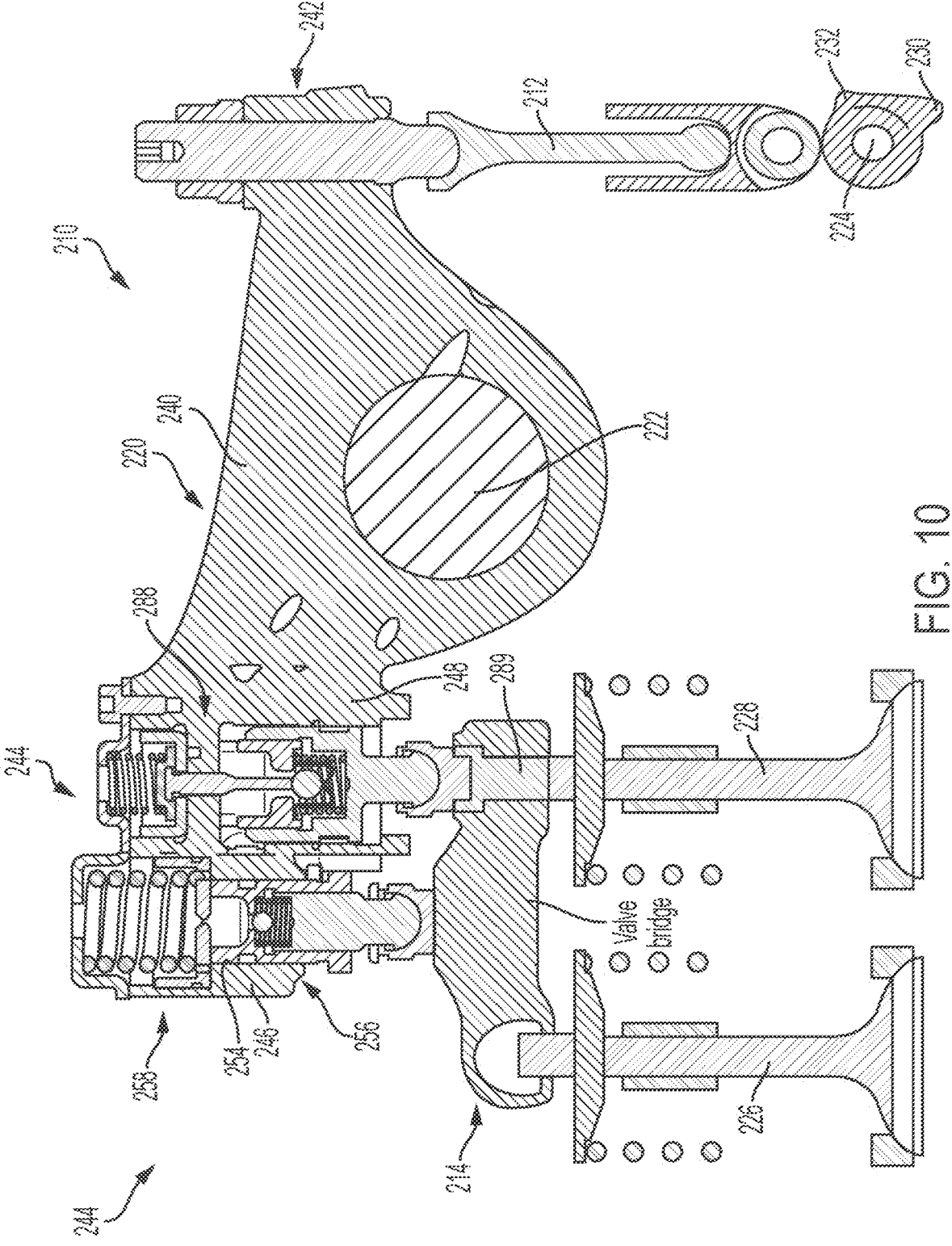
FIG. 10 is a cutaway view of another example combined exhaust and engine brake rocker arm assembly, which includes a hydraulic lash adjuster assembly integrated with a lost motion mechanism.

With reference now to FIG. 10, a combined exhaust and engine brake rocker arm assembly constructed in accordance to another example of the present disclosure is shown and generally identified at reference 220. The rocker arm assembly 220 is similar to rocker arm assembly 20, except engine brake capsule 288 is located between exhaust capsule 256 and rocker shaft 222 in an axial direction (as shown in FIG. 10). Moreover, in the example embodiment, the rocker arm assembly 220 is shown in a Type V valve train arrangement 210, but it will be appreciated that it is within the scope of the present disclosure for various features described herein to be used in other arrangements. In this regards, the features described herein associated with the illustrated valve train arrangement can be suitable to a wide variety of applications.

In the example implementation, the combined exhaust and engine brake rocker arm assembly 220 is associated with an exhaust pushrod 212, a valve bridge assembly 214, and exhaust valves 226, 228. A rocker shaft 222 is received by a valve train carrier (not shown) and supports rotation of the combined exhaust and engine brake rocker arm assembly 220. The rocker shaft 222 can communicate oil to the rocker arm assembly 220 during operation. A cam shaft 224 includes an exhaust event lift profile or lobe 230 and a brake event lift profile or lobe 232, which respectively cause combined rocker arm assembly 220 to operate in an exhaust event mode and a brake event mode.

In the example embodiment, the combined rocker arm assembly 220 can generally include a rocker arm body 240 having a first end 242 and an opposite second end 244. The rocker arm body first end 242 is configured to be indirectly driven by the cam lobes 230, 232 via the pushrod 212. This pivots the rocker arm body 240 about the fixed rocker shaft 222, thereby causing the rocker arm second end 244 to selectively press the valve bridge assembly 214 and actuate one or more of the valves 226, 228, as described herein in more detail. The rocker arm body second end 244 includes an exhaust rocker arm portion 246 and an engine brake arm portion 248.

The exhaust rocker arm portion 246 defines a bore 254 configured to at least partially receive an HLA assembly or exhaust capsule assembly 256 integrated with a lost motion mechanism 258. As such, the exhaust rocker arm portion 246 provides both an automatic hydraulic lash adjustment feature and a lost motion feature.

During the exhaust event mode, the rocker arm body first end 242 is engaged by the exhaust lift profile 230, and the exhaust rocker arm portion 246 and HLA assembly 256 can be rotated downward, causing downward movement of the valve bridge assembly 214, which engages the first and second exhaust valve 226 and 228.

During the engine brake event mode, the lost motion mechanism 258 absorbs the engine brake lift (e.g., lobe 232) and prevents transfer of the motion to the center of the valve bridge assembly 214 while brake lift is transferred to valve 228, as described herein in more detail. In this way, the lost motion mechanism 258 keeps the HLA assembly 256 and valve bridge assembly 214 under load during the engine brake lift (e.g., lobe 232), which prevents pump-up of the HLA assembly 256. When the cam 224 is on base circle (e.g., no lobe/lift), the lost motion mechanism 258 reaches a hard stop to a maximum extension, and any remaining gap to the valve bridge assembly 214 is compensated by the HLA assembly 256.

The exhaust capsule (HLA assembly) 256 is a deactivating hydraulic capsule similar to exhaust capsule assembly 56 (FIGS. 6A-6C). With additional reference to FIG. 11, in the exemplary implementation, the HLA assembly 256 can comprise a plunger assembly 260 including an outer plunger or first plunger body 262 and an inner or second plunger body 264. The first plunger body 262 is slidingly received within bore 254, and can have a first end 265 configured to act against a stopper or lost motion plunger 266 of the lost motion mechanism 258, and an open second end 267 configured to slidingly receive the second plunger body 264.

The second plunger body 264 includes a first end defining a spigot 268, and an opposite second end defining a seat 269. The spigot 268 is received in a socket 270 that acts against the valve bridge 214, and the seat 269 is configured to receive a check ball assembly 274. The first plunger body 262 includes an opening that defines a valve seat 272 for the check ball assembly 274, which is positioned between the first and second plunger bodies 262, 264.

Figure 11:
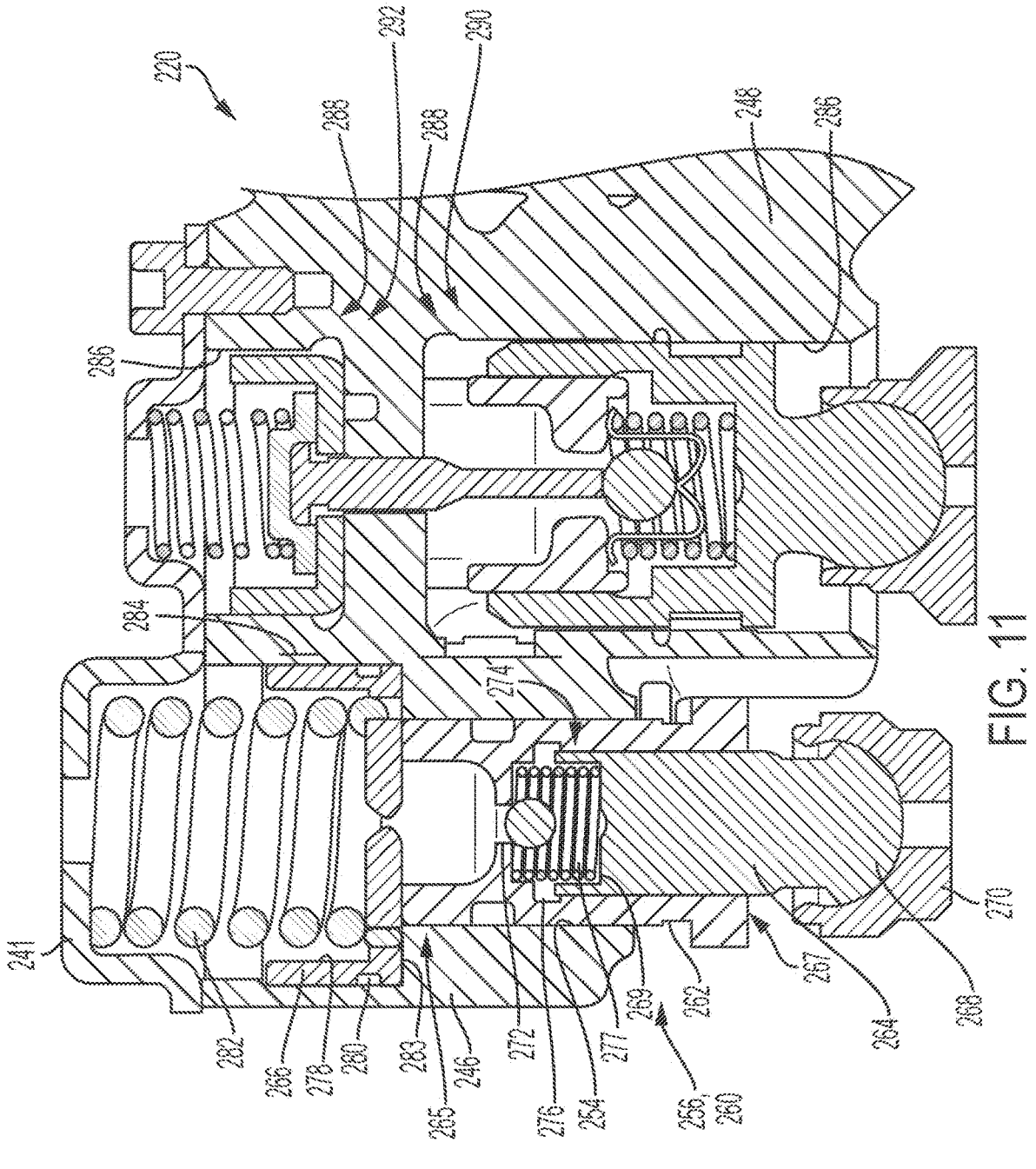
FIG. 11 is an enlarged view of the integrated hydraulic lash adjuster assembly and lost motion mechanism shown in FIG. 10.

The check ball assembly 274 can be configured to hold oil within a chamber 276 between the first and second plunger bodies 262, 264. A biasing mechanism 277 (e.g., a spring) biases second plunger body 264 downward (as shown in FIG. 11) to expand the second plunger body 264 to take up any lash. As second plunger body 264 is biased downward, oil is drawn through check ball assembly 274 and into the chamber 276 between plunger bodies 262, 264. Accordingly, oil can be supplied from rocker shaft 222 through a channel (not shown) to the chamber 276 within first plunger body 262, and downward pressure can cause downward movement of the second plunger body 264 due to the oil in the chamber 276. However, HLA assembly 256 may have any other suitable configuration that enables the assembly to take up lash between the assembly and the valve bridge 214.

In the example embodiment, lost motion mechanism 258 includes lost motion plunger 266 and a lost motion biasing mechanism 282 (e.g., a spring). The lost motion plunger 266 is disposed within bore 254 above the first and second plunger bodies 262, 264 and generally includes an annular or generally annular bore 278 and an annular or generally annular groove 280. The annular bore 278 is configured to receive and seat at least a portion of a lost motion biasing mechanism 282 such that the biasing mechanism 282 is disposed between the rocker arm body 240 (or a cover 241, as shown) and the lost motion plunger 266. In this way, lost motion biasing mechanism 282 is configured to bias the lost motion plunger 266 downward (as shown in FIG. 11) toward a travel limiting stop or shoulder 283. Biasing mechanism 282 is configured to selectively absorb motion of the rocker arm assembly 220 during the engine brake event mode such that exhaust rocker arm portion 246 does not impart movement to the valve bridge assembly 214 to open valves 226, 228.

In the example embodiment, annular groove 280 is formed in an outer wall of lost motion plunger 266 and is configured to selectively receive a hydraulic fluid from a fluid port 284 that is formed in rocker arm body 240 when annular groove 280 and fluid port 284 are aligned. At this point, annular groove 280 aligns with fluid port 284, which vents the high pressure fluid that is lifting an actuator assembly 292 of a brake capsule assembly 288 and causes a brake plunger assembly 290 to return to the collapse mode. As such, the brake capsule assembly 288 is "reset" and the combined rocker arm assembly 220 does not transfer the cam motion to the valve 28.

With continued reference now to FIGS. 10 and 11, the engine brake rocker arm portion 248 of combined exhaust and engine brake rocker arm assembly 220 will be described in more detail. In the example embodiment, engine brake rocker arm portion 248 defines a bore 286 configured to at least partially receive an HLA assembly or brake capsule assembly 288, which includes brake plunger assembly 290 and actuator assembly 292. The brake capsule assembly 288 is similar to brake capsule assembly 88 and functions in a similar manner to selectively move from a collapsing mode (FIG. 7A) to a rigid mode (FIG. 7B) to selectively transfer cam motion to the valve 28 during an engine braking event. In a similar operation, when rocker arm body first end 242 is engaged by the engine brake lift profile 232, the engine brake rocker arm portion 248 and brake capsule assembly 288 can be rotated downward, causing downward movement of a sliding pin 289 (FIG. 10) in the valve bridge assembly 214, to thereby engage and open only the second exhaust valve 28 (i.e., not valve 26).

Described herein are systems and methods for a single rocker arm assembly configured to selectively perform exhaust and engine braking events on an engine. The system includes a single rocker arm having an exhaust rocker arm assembly and an engine brake rocker arm assembly. The exhaust rocker arm assembly includes an HLA integrated with a lost motion mechanism. During engine braking, the lost motion mechanism absorbs brake lift and prevents transfer to the valve bridge, while maintaining load on the HLA to prevent pump up. The engine brake rocker arm assembly includes a brake capsule assembly configured to be moved between a collapse mode and a rigid mode. In the collapse mode, the brake capsule does not transfer motion to the valve bridge assembly. In the rigid mode, the brake capsule transfers motion to the valve bridge assembly to actuate one of the two valves to perform an engine brake event.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A rocker arm configured to perform a first event and a second event against a valve bridge assembly operably associated with first and second engine valves, the rocker arm comprising:
   a rocker arm body configured to rotate about a rocker shaft, the rocker arm body comprising:
   a first event rocker arm assembly comprising a hydraulic capsule in a bore; and
   a second event rocker arm assembly disposed between the first event rocker arm assembly and the rocker shaft in an axial direction of the rocker arm body,
   wherein the hydraulic capsule is configured to selectively engage the valve bridge assembly to open the first and second engine valves.

2. The rocker arm of claim 1, wherein the hydraulic capsule comprises a plunger assembly including an outer plunger body and an inner plunger body.

3. The rocker arm of claim 2, wherein the outer plunger body is slidingly received in the bore of the first event rocker arm assembly, wherein the outer plunger body slidingly receives the inner plunger body.

4. The rocker arm of claim 2, wherein the inner plunger body comprise a first end associated with the valve bridge assembly and an opposite second end defining a first seat.

5. The rocker arm of claim 4, wherein the first seat of the inner plunger body is configured to receive a check ball assembly.

6. The rocker arm of claim 5, wherein the outer plunger body comprises an opening defining a second seat for the check ball assembly.

7. The rocker arm of claim 5, wherein the hydraulic capsule further comprises a biasing mechanism configured to bias the inner plunger body to expand toward the valve bridge assembly.

8. The rocker arm of claim 1, wherein the first event rocker arm assembly further comprises a lost motion mechanism disposed in the bore.

9. The rocker arm of claim 8, wherein the lost motion mechanism comprises:
   a lost motion plunger body; and
   a lost motion biasing mechanism configured to selectively absorb motion of the rocker arm.

10. The rocker arm of claim 1, wherein the second event rocker arm assembly comprises an engine brake capsule.

11. The rocker arm of claim 10, wherein the engine brake capsule is configured to selectively move between a collapse mode and a rigid mode.

12. The rocker arm of claim 10, wherein the engine brake capsule comprises an actuator assembly and a brake plunger assembly configured to be actuated by the actuator assembly.

13. The rocker arm of claim 10, wherein the engine brake capsule is disposed between the hydraulic capsule and the rocker shaft in the axial direction of the rocker arm body.

14. The rocker arm of claim 1, wherein the rocker arm is configured to be indirectly driven by one or more cam lobes via a pushrod.

15. The rocker arm of claim 1, wherein the hydraulic capsule is a hydraulic lash adjuster (HLA) assembly configured to take up a lash between the hydraulic capsule and the valve bridge assembly.

16. A rocker arm configured to perform a first event and a second event against a valve bridge assembly operably associated with first and second engine valves, the rocker arm comprising:

a rocker arm body configured to rotate about a rocker shaft, the rocker arm body comprising:

a first event rocker arm assembly comprising a hydraulic capsule; and a second event rocker arm assembly comprising an engine brake capsule, the second event rocker arm assembly being disposed between the first event rocker arm assembly and the rocker shaft in an axial direction of the rocker arm body, wherein the hydraulic capsule is configured to selectively engage the valve bridge assembly to open the first and second engine valves, wherein the engine brake capsule is configured to selectively engage the valve bridge assembly to open only the second engine valve.

17. The rocker arm of claim 16, wherein the engine brake capsule is disposed between the hydraulic capsule and the rocker shaft in the axial direction of the rocker arm body.

18. The rocker arm of claim 16, wherein the hydraulic capsule comprises a plunger assembly including an outer plunger body and an inner plunger body.

19. The rocker arm of claim 18, wherein the outer plunger body is slidingly received in a bore of the first event rocker arm assembly, wherein the outer plunger body slidingly receives the inner plunger body.

20. A rocker arm configured to perform a first event and a second event against a valve bridge assembly operably associated with first and second engine valves, the rocker arm comprising:

a rocker arm body configured to rotate about a rocker shaft, the rocker arm body comprising:

a first event rocker arm assembly comprising a hydraulic capsule, the hydraulic capsule having an outer plunger body and an inner plunger body; and a second event rocker arm assembly comprising an engine brake capsule, the second event rocker arm assembly being disposed between the first event rocker arm assembly and the rocker shaft in an axial direction of the rocker arm body, wherein the hydraulic capsule is configured to selectively engage the valve bridge assembly, via the inner plunger body, to open the first and second engine valves, wherein the engine brake capsule is configured to selectively engage the valve bridge assembly to open only the second engine valve.

* * * * *